United States Patent

Steenborg

[11] Patent Number: 4,470,258
[45] Date of Patent: Sep. 11, 1984

[54] THRUSTER FOR SPACE VEHICLES
[75] Inventor: Manfred Steenborg, Ritterhude, Fed. Rep. of Germany
[73] Assignee: Erno Raumfahrttechnik GmbH, Huenefeldstrassel-5, Fed. Rep. of Germany
[21] Appl. No.: 399,469
[22] Filed: Jul. 19, 1982
[30] Foreign Application Priority Data
Jul. 21, 1981 [DE] Fed. Rep. of Germany ....... 3128735
[51] Int. Cl.³ .............................................. F02K 11/00
[52] U.S. Cl. .................................. 60/200.1; 60/39.462
[58] Field of Search ...................... 60/200.1, 203.1, 218, 60/39.462

[56] References Cited

U.S. PATENT DOCUMENTS 3,064,902 11/1962 Moore et al. .................... 60/39.462
3,533,233 10/1970 Fiedler et al. .................... 60/39.462
3,719,046 3/1973 Sutherland et al. .............. 60/39.462
3,871,828 3/1975 Ellion et al. ..................... 60/39.462
4,288,982 9/1981 Kuenzly et al. .................. 60/39.462

FOREIGN PATENT DOCUMENTS 1473749 5/1977 United Kingdom .

Primary Examiner—Louis J. Casaregola
Attorney, Agent, or Firm—Ralf H. Siegemund

[57] ABSTRACT

A thruster particularly for maneuvering space vehicles is provided with a device for decomposing liquid fuel into gaseous components. It includes the decomposition chamber and a heating device downstream for further heating and decomposing the gaseous products. The heater is preferably a coiled tube disposed in the inner one of two concentrically nested sleeves, the space between them being a part of a recuperative heat exchanger. The coiled tube ends in the thrust producing nozzle while its other end is connected to the space between the nested tubes.

14 Claims, 3 Drawing Figures

THRUSTER FOR SPACE VEHICLES

BACKGROUND OF THE INVENTION

The present invention relates to a propulsion unit or thruster particularly for controlling and maneuvering spacecraft.

British Pat. No. 1,473,749 describes a thruster of the type to which the invention pertains which includes a chamber for decomposing a propellent fuel such as hydrazine. A heating device is disposed downstream from the decomposition chamber proper for additionally heating and additinally decomposing the propellent gases produced in the decomposition chamber. A gas ejection, jet producing nozzle is connected to that heater for accelerating and ejecting the propellant gases for producing thrust.

Thrusters of the type described are used particularly for attitude control, orbit correction, station keeping, repositioning and other space craft maneuvers. If hydrazine is used, ($N_2 H_4$) this fuel can be decomposed either by a catalytic reaction or as specifically disclosed in the above identified British patent, the decomposition reaction may be thermally induced causing the hydrazine to decompose into the gaseous decomposition products $NH_3$, $N_2$, and $H_2$. The decompositioning reaction is an exothermic one developing in fact a considerable amount of heat i.e. useful enthalpy. The gases as produced will in turn produce the thrust necessary for the type of maneuvers mentioned above.

The British Pat. No. 1,473,749 discloses further that the thrust can be enhanced if the gasseous reaction and decomposition products are heated further and if the ammonia gas $NH_3$ resulting from the primary decomposition process is further decomposed into nitrogen and hydrogen. This particular reaction is an endothermic one. The gases, therefore, are ejected only after this secondary reaction. In fact, the gases so ejected have a still higher speed which is a result of a pressure increase. This pressure increase, in turn, is a result of the supplemental heating in fact increasing the kinetic energy of the propulsion gases; on the other hand, the speed is increased as a result of the changes in the composition of the gas mixture as a result of the ammonia decomposition as a secondary reaction. As stated above, the British patent suggests a supplemental heating chamber for purposes of providing the additional heating and secondary decompositioning which supplemental chamber contains and supports a spirally coiled metal tube. The propulsion and reaction gases flow through that tube and are heated therein by means of electrical resistance heating. The British patent discloses further an alternative construction in which the propulsion gases flow tangentially into a cylindrical heating chamber containing in its center a heating coil.

DESCRIPTION OF THE INVENTION

It is an object of the present invention to provide a new and improved thruster for purposes of controlling and maneuvering a space vehicle under utilization of decompositioning a liquid fuel followed by heating of the decomposition products to provide further decompositioning of the gaseous products. The improvement is to be related to increased performance, duration of operation and enhancement of insensitivity against mechanical loads and other operating interferences.

In accordance with the preferred embodiment of the preferred invention, it is suggested to provide a decomposition chamber for fuel feeding its gaseous products to a heat exchanger constructed to have two nested concentric chambers, the outer one of the chambers receiving directly the decomposition products from the decomposition chamber and feeding in turn a gas heater disposed inside the inner one of the two concentric chambers, the gas heater feeding the thrust producing nozzle. The gas heater is prefereably a helically coiled tube having one end connected to the other one of the two concentric chambers at a point facing away from the point of connecting this outer chamber to the decomposition chamber. The other end of the helically coiled tube is preferably constructed as a tubular extension which traverses the interior of the helically coiled tube in coaxial relations to merge directly into the thrust producing nozzle. The coiled tube is preferably heated directly electrically and is made of a high temperature strength material such as rhenium, tungsten/rhenium or molybdenum tungsten. The helically coiled tube is preferably mounted in a spacer made of boron nitrite for keeping the loops of the coil separated from each other as well as separating the coil from the wall of the inner chamber.

The decomposition chamber feeds the gaseous products by means of a nozzle into the outer one of the two concentric chambers. The decomposition chamber and the heat exchanger can be arranged in a coaxial relationship or in a right angle relationship. In the latter case the gas feeding should occur tangentially so that the outer chamber of the two concentric heat exchange chambers charged in a whirling flow increasing therefor the residence time of the gas in the chamber. The decomposition chamber and the heat exchanger are preferably mounted in a common thermal insulating body, and in cases they may be interconnected in electrically conductive relationship for obtaining direct electric heating and permitting therefor a thermo-electric decomposition process.

The arrangement in accordance with the present invention has the advantage that the gases developed in the decomposition chamber are preheated in a recuperative arrangement by virtue of the flow through the outer one of the two concentric chambers. The gas heating device such as the helical coil in the inside of the inner one of the two chambers has a tendency of radiating heat in a radially output direction but that heat is recaptured by the walls of the chambers to thereby heat the gas as it flows through the outer one of the two concentric chambers. This in effect amounts to a reoperative preheating of the decomposition gas before they enter the coil heating tube. And increases the efficiency of fuel use so that in turn the amount of fuel needed for particular tasks is reduced and the payload can be increased accordingly. Alternatively, the operating period is increased.

Other advantages resulting particularly from the construction details to be explained more fully below with reference to the accompanying drawings are to be seen in a considerable improvement of the blowdown conditions amounting to an increase in the pressure range within which the inventive thruster operates and is in fact still operative. Moreover, the overall construction is rather robust and can stand considerable amount of vibration loads; pressure peaks in the decomposition chamber can be taken up more readily. The construction as a whole is self-contained and is of the type which reduces heat losses by means of its mounting structure.

Also as will be explained more fully below with reference to the example in the drawings, the thruster in accordance with the invention permits a so called off-modulation permitting particularly during basically continued operation an interruption of the fuel flow and therefore of a gas flow from the decomposition chamber in a more or less irrhythmic intermittent manner.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawing, FIG. 1 illustrates a high performance electrothermal thruster to be used for controlling the attitude orbital position etc . . . of a spacecraft satelite space vehicle or the like. This thruster includes a primary decomposition chamber 1 into which liquid fuel is fed which an injection tube 2, which in turn is connected to a fuel tank. The fuel tank has been ommitted for the sake of clarity and it is assumed that the fuel contained in that tank and fed to the reaction chamber 1 is hydrazine. This particular tank will be disposed in effect above the device as illustrated in FIG. 1. The flow from that tank runs through an electrically operated valve 3, which in effect controls the flow of hydraine towards and into the decomposition chamber 1. A heat exchanger 4 is positioned underneath reaction chamber 1 and a flow path for gas is provided in the heat exchanger for the gas being derived from chamber 1. Details of this heat exchanger will be explained below with reference to FIG. 3. A nozzle 5 for ejecting a stream of gas is disposed in the bottom of heat exchanger 4.

Figure 1:
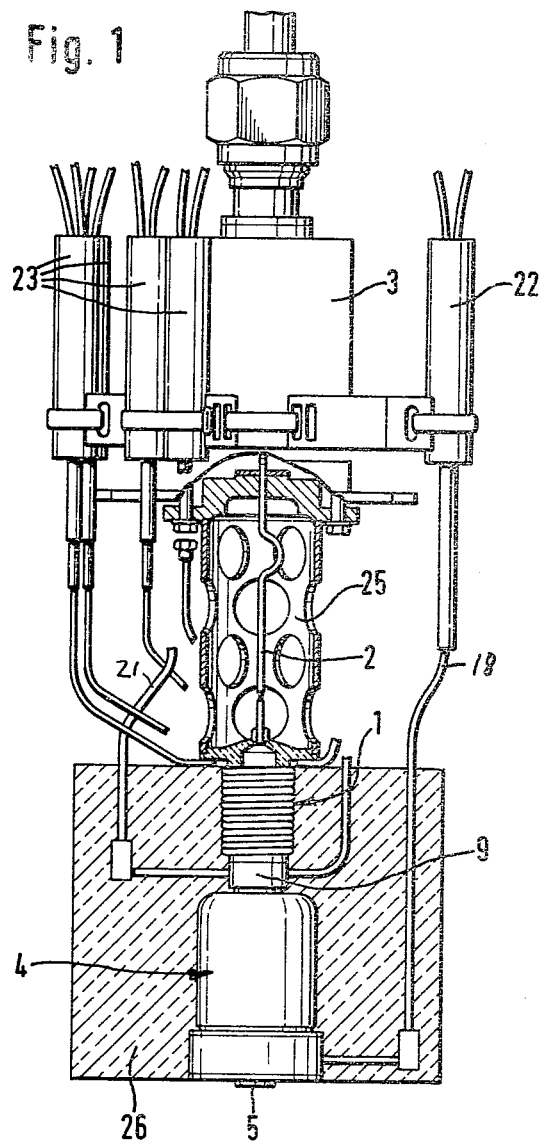
FIG. 1 is a partial cross section partial side elevation of a first example for practicing the preferred embodiment of the invention in accordance with the best mode thereof.

The chamber 1 is of cylindrical configuration and is enveloped and circumscribed by a multilayer heating coil arrangement 6, the lowest layer of this coiling arrangement is in direct and immediate thermal contact with the wall of the decomposition chamber 1 and through the wall with the interior of that chamber. The chamber 1, moreover, includes a porous filling 7 of a heatable material having a heat capacity sufficent for establishing the requisite reaction temperature inside chamber 1. In the present case it is preferred to use a ball filling, i.e. a filling of platinum/rhodium alloy, or balls of pure platinum/rhodium. Underneath the bottom of chamber 1 is provided an adapter or connector 9 which includes a nozzle opening and duct 8 having an antechamber 8a. This adapter 9, in fact, connects gas to the interior of decompositioning chamber 1 to the heat exchanger 4 and here particularly an outer chamber 10 thereof. The outer chamber 10 of heat exchanger 4 is established essentially by two telescopes i.e. concentrically disposed and nested cylindrical sleeves 11 and 12 being spaced apart radially and held in position by an adapter piece 13. The sleeve 12 is the inner one of the two and has accordingly an internal or inside chamber 14. A spirally coiled tube 15 is disposed within that chamber. The tube 15 is constructed from a high temperature resisting material such as, for example and preferrably, rhenium. A tungsten-rhenium or tungsten-molybdenum alloy can also be used.

Tube 15 is embedded in an insert 16 made of boron nitride and establishing a temperature insulation between the sleeve 12 and the tube 15. Moreover, the boreon nitride body 16 provides also for a spacing function for the tube 15 inside and away from the inner wall of sleeve 12. Moreover, one can see that the body and insert 16 is profiled on its inside walls corresponding with the helix of the coiled tube 15, this way the conture of body 16 separates the several loops of the coil 15 from each other and prevents these loops from engaging.

The tube 15 inside the two nested sleeves, is particularly shaped so that the lower end of the spiral i.e. the end facing away from the decomposition chamber 1 merges tangentially with the adapter 13 and into the outer chamber 10. The other end of the coil is radially bent towards the axis of the coil and further axially into and along the interior of the coil, that is to say the last loop of the coil facing chamber 1 is continued in a central portion and runs concentrically with the remainder of the coil and ends in a nozzle 5. The nozzle 5 is mounted in a centering piece 17 with in turn is held in the appropriately contured lower portion of adapter 13. This way nozzle 5 is centered with respect to the two sleeves 11 and 12.

Reference numerals 18, 19, 20, and 21 refer to electrical conductor pieces which provide an electric current path. Herein the conductor 19 connects electrically conductively to the nozzle 5 which in turn is electrically conductively connected to the coil 15. The conductor 20, on the other hand, is electrically conducted and connected to the adapter 9. The latter in turn is in electrical conductive relationship with the sleeves 11 and 12 while, as stated above, the one end of the coiled tube 15 is electrically conductive in and connected to the adapter 13. Therefore, a direct electric current path exists between the conductors 19 and 20 or one can also say that an electric conductive path exists from the conductor 18 to the conductor 21 being connected to a device 22 for power supply for heating current. This way tube 15 is directly electrically heated. The heating element is in addition connected to an electronic control circuit which controls the current flowing into and through the coiled tube 15. Also the control of heating current should include circuitry for limiting the electric current. Additional conductors feed current to the heating coil 6 and the various heating conductors receive power about heating connectors 23. All these heating current sources are mounted to the casing of the valve 3. The heating device 23 may also be under control of circuitry for controlling and/or limiting the heating current.

Reference numeral 24 refers to a measuring tube or gas sampling probe which communicatively connects to the decomposition chamber 1 and assertains the pressure of the gas that emerges from the chamber and flows into the ante-chamber 8a of nozzle 8 in adapter 9. The entire arrangement, including heating structure for the chamber, that chamber itself and the heat exchanger 4 are all embedded in a ceramic, isolating body 26. The fuel injection tube 2 is concentrically arranged inside a vented heat shield 25.

The embodiment described with reference to FIGS. 1 and 3 exhibits a coaxial arrangement of the decomposition chamber 1 and of the heat exchanger 4, and the nozzle opening 8 is coaxial with both and feeds the outer chamber 10 of the heat exchager 4. The physical arrangement of the heat exchanger and of the decomposition chamber 1 is a different one in the device shown in FIG. 2. Here the axis of these two elements are arranged at right angles to each other. Accordingly, the adapter and communicating unit interconnecting the decomposition chamber 1 and the heat exchamer 4 is slightly different from the arrangement shown in FIG. 1; the adapter 9' is provided with a nozzle opening 8' which feeds the slightly modified outer chamber 10' of the heat exchanger 4 in this case. The result of this modified arrangement is, of course, that the nozzle 5 ejects a jet laterally from the arrangement as a whole. Otherwise the device and its elements are of similar construction and the same functions are performed in both embodiments. One can see that the difference between the two devices is really to be seen in the difference in the desired direction of ejection of the control and maneuvering gas jet.

In operation the balls of filling 7 in decomposition chamber 1 are heated to a suitable temperature in excess of 500° centigrade. The heating, of course, is carried out by application of electric current to the heating coils 6 looping around and circumscribing the chamber 1. There may be a control circuit including a sensor included which signals the attainment of the desired temperature and as soon as the temperature has reached the desired, requisite or at least a minimum value, the valve 3 is opened to permit hydrazine to flow into and through the injection tube 2 to charge the voids between the balls in chamber 1. It can readily be seen that this injection results in a very effective very extensive contact between the liquid hydrazine and the heated ball. Therefore, liquid hydrazine vaporizes and decomposes rapidly and in relatively large quantities and the particular resulting decomposition gases flow down towards the ante-chamber of nozzle 8.

The evaporation and decompositioning that occurs is as stated an axialthermic reaction and the temperature attained is about 1200° centigrade. Therefore, the gases and $N_2$ and $NH_3$ produced by the decomposition of the reaction have that temperature. The $NH_3$, however, disassociates and decompose additionally into the gases $N_2$ and $H_2$ which is an endothermic reaction lowering the overall temperature of the gas mixture to about 900° centigrade. That is the temperature of the gas mixture which reaches the nozzle 8 and flows into the outer chamber 10 of heat exchanger 4.

Due to the effective thermal insulation, the gas loses little of its temperature so that in fact the gas being charged into the coiled tube 15 has essentially that temperature. It will be recalled that electric current flows through the tube 15 heating same so that the gas flowing through the tube 15 is heated to a temperature which ranges between 1500° to 1800° centigrade. The operation permits a fairly wide margin of temperature though conceivable the exit temperature of the gas can be accurately kept constant by controlling the electric current that flows through the coiled tube 15.

In a more simplified manner, the electric control of the heating process of the tube 15 may involve only limiting the current to such an extent that the temperature does not exceed, for example, 2100° centigrade. This problem of temperature limiting must be understood from the point of view of the overall dynamic operation. The gas flowing through the tube 15 is in effect a coolant as far as the tube is concerned, and if the gas flow is interrupted for some reason or is slowed down, for example, for reason of the operation of the valve 3 or possibly even for reason of a temporary malfunction, the heat transfer from the tube to the gas flowing through the tube 15 may temporarily be reduced or even interrupted and that, of course, changes the temperature balance as between the tube 15 and the gas. Upon receiving a constant electric current but giving off less thermal energy, there will be increase in temperature and that is exactly a condition which should be avoided. In other words, the temperature limiting operation, as far as the electric current flow through the tube 15 is concerned, is an operation which provides as safeguard against undue heating in the case of a temporary or even quasi permanent interruption of gas flow. The operation may be such that after the heating current has been interrupted it may be turned on again if the temperature or the tube 15 has dropped to, say, 1900° centigrades or below.

The coil 15 as heated radiates heat and transmits heat also that into the insert body 16. Some of the heat is transferred further to the inner sleeve 12. There are only a few heat bridges which connect these two parts just sufficient to mount body 16 inside sleeve 12. However sufficient support here makes certain heat transfer conditions inevitable. Sooner or later the inner sleeve 12 will heat to a higher temperature. This, however, is not a disadvantage because the heat that is imparted upon this sleeve 12 will be given off to the gas flowing into and through chamber 10. This way one has in fact a recuperative arrangement in which the heat flow out of the heating arrangement that includes the tube 15 is recaptured for purposes of preheating the gas in chamber 10. It can readily be seen that the arrangement minimizes the heat flow out of the system and particularly into the isolating body 26.

The gas that flows through and leaves tube 15 consists of a mixture of $N_2$ and $H_2$. That mixture is heated to a temperature within the range mentioned above and is fed to the nozzle 5. This gas moves through the nozzle, is accelerated therein and leaves at a relatively high speed between 2700 to 3100 meters per second. This high speed in turn results in a rather large thrust and in a comparably large specific impulse (momentum). The following several performance data for a thruster are typical in accordance with the present inventions. The maximum thrust is between 200 and 250 millinewtons. The specific momentum is proportional to 300 seconds and the operating period may last up to 150 hours.

Figure 2:
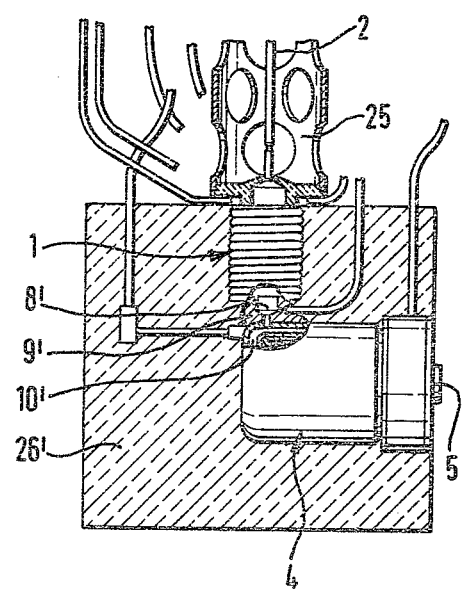
FIG. 2 illustrates a partial modification of FIG. 1 and illustrates, therefore, a second example of the preferred embodiment.
Figure 3:
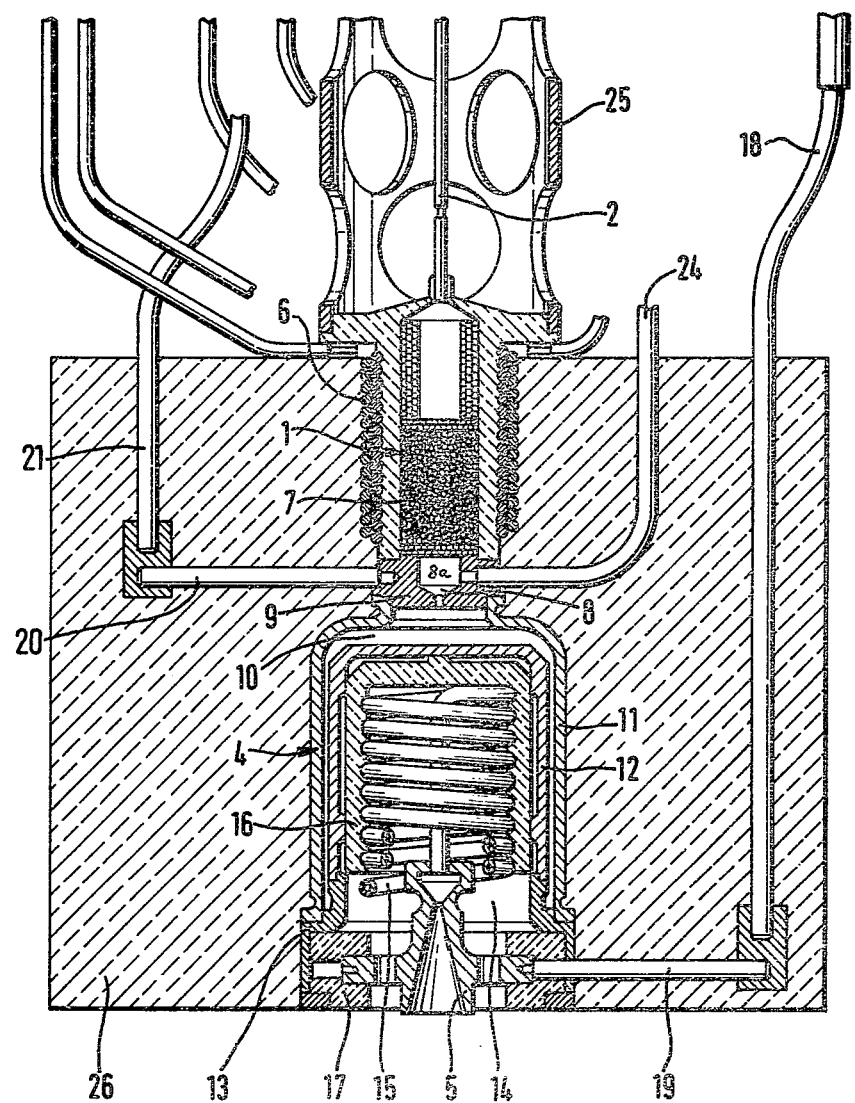
FIG. 3 is a cross section through an enlarged portion of the device shown in FIG. 1.

The particular coaxial condition and construction as depicted in FIGS. 1 and 3 may be dictated primarily by the particular tasks and the construction and mounting conditions on the vehicle to be manuvered. The right angle arrangement shown in FIG. 2 may be required in certain instances but most importantly it was found that the utilization and efficiency of heating provided by and in heat exchanger 4 is quite superior. The very fact that the propulsion gases entered the outer chamber of the heat exchanger in tangential direction does in fact increase the thermal interaction between the chamber of the heat exchanger and the gas. This means that the heat transfer from the inner wall of the outer sleeve is improved and the heat radiation, in a direction out or the system is reduced further as compared with the examples shown in FIGS. 1 and 3.

In all of these instances, i.e., in the example shown in FIGS. 1 and 3 as well as in the example shown in FIG. 2, the possibility exists to operate the thruster unit even if the heating system for the decomposition chamber 1 has dropped out for reasons of failure. Since the decomposition chamber 1 and the heat exchanger 4 are interconnected in thermal, conductive relationship by means of the adapter 9 or 9' as the case may be, the filling 7 of the decomposition chamber 1 can be heated through the same heating system which heats the tube 15. This is feasible since the electronic decontrol circuit for controlling the current that flows through the tube 15 prevents as stated above excess heating of the tube and its destruction, particularly in the case of a fluid and propulsion gas dropout.

The invention is not limited to the embodiments described above; but all changes and modifications thereof, not constituting departures from the spirit and scope of the invention, are intended to be included.

I claim:

1. Thruster for the control of space vehicles comprising:
    a decomposition chamber for a liquid fuel causing the liquid fuel to decompose into gaseous products:
    a heat exchanger provided with two concentric chambers, an outer one of the two chambers being gas conductively connected to said decomposition chamber to receive gas therefrom; a gas heating device mounted in an inner one of the two chambers; gas conduit means for connecting the gas heating device to the outer chamber to receive gas flowing through the outer chamber; and
    a thrust producing gas discharge nozzle connected to receive heated gases from the heating device.

2. A thruster as in claim 1, said heating device including a spirally shaped tube being gas conductively connected to said outer chamber by said gas conductive means, another end of the spirally shaped tube being connected to said gas discharge nozzle.

3. A thruster as in claim 2, said spirally shaped tube constructed so that one of its ends is connected to the outer chamber at a point of the outer chamber remote from said decomposition chamber.

4. A thruster as in claim 3, the other end of the tube having a portion which is disposed axially to the helically shaped tube to merge coaxially with an axis of the gas discharge nozzle.

5. A thruster as in claim 2, said tube serving directly as electric heating element, the thruster including means for feeding electric current to said tube.

6. A thruster as in claim 5, said tube being made of a high temperature strength material.

7. A thruster as in claim 6, said material being selected from the group consisting of rhenium, a tungsten rhenium alloy and a molybdenum tungsten alloy.

8. A thruster as in claim 4 or 5, said coiled tube having individual loops, there being a high temperature insulating mounting body for the tube provided with means for physically separating and axially spacing the loops from each other as well as from a wall of said inner chamber.

9. A thruster as in claim 8, said spacing body being made of a boron and nitrite.

10. A thruster as in claim 1, including another nozzle connected for feeding gas from the decomposition chamber into the outer chamber of said heat exchanger.

11. A thruster as in claim 1, said decomposition chamber and said concentric heat exchange chambers being disposed in coaxial relation to each other.

12. A thruster as in claim 1, said decomposition chamber having an axis being arranged at right angles to an axis of said concentric chambers, said outer chamber having a feed point being tangentially arranged in an outer wall of said chamber.

13. A thruster as in claim 1 wherein said decomposition chamber provides for electrothermical decomposition, said decomposition chamber and said heat exchanger being electrically conductive, there being means for interconnecting the heat exchange and the decomposition chambers for obtaining conduction of electric current.

14. A thruster as in claim 1, said decomposition chamber and said heat exchanger being mounted in a common thermal isolating body.

* * * * *